United States Patent
Robins

(10) Patent No.: US 6,288,380 B1
(45) Date of Patent: Sep. 11, 2001

(54) ADAPTIVE BODY-BENDING ESTIMATOR FOR USE WITH A MISSILE DURING FLIGHT

(75) Inventor: Larry Allen Robins, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/545,842

(22) Filed: Apr. 10, 2000

(51) Int. Cl.⁷ .................................................. B64C 17/00
(52) U.S. Cl. ...................... 244/3.1; 244/3.15; 244/75 R; 244/76 R; 73/570; 73/584; 73/649; 701/3; 701/4; 701/11
(58) Field of Search .................................. 244/3.1, 3.15, 244/3.16–3.23, 1 R, 1 N, 17.13, 75 R, 76 R, 175, 191, 194, 195, 76 C, 75 A; 701/1, 3, 4, 11, 12; 73/570, 584, 649–661

(56) References Cited

U.S. PATENT DOCUMENTS

| | | | |
|---|---|---|---|
| 4,965,879 | * | 10/1990 | Fischer, Jr. ................................ 701/3 |
| 5,072,893 | * | 12/1991 | Chakravarty et al. .............. 244/76 R |
| 5,242,130 | * | 9/1993 | Mouille et al. ..................... 244/17.13 |
| 5,360,184 | * | 11/1994 | Johnson .................................. 244/3.2 |
| 5,452,865 | * | 9/1995 | Tran et al. .......................... 244/75 A |
| 5,667,166 | * | 9/1997 | Tran et al. .......................... 244/76 C |
| 5,816,533 | * | 10/1998 | Krysinsky .......................... 244/17.13 |
| 5,833,173 | * | 11/1998 | Tran et al. .......................... 244/75 A |
| 5,860,625 | * | 1/1999 | Tran et al. ............................. 244/195 |

\* cited by examiner

Primary Examiner—Bernarr E. Gregory
(74) Attorney, Agent, or Firm—David Kalmbaugh

(57) ABSTRACT

The adaptive body bending estimator comprises a band pass filter which receives an accelerometer signal from a missile's accelerometer. The band pass filter, which has a bandpass of 25–70 hertz, rejects frequencies which are not of interest. The band-passed signal is then supplied to a notch filter bank comprising six notch filters within a frequency range of between 42 hertz and 55 hertz. The six notch filters are centered at different frequencies, the frequencies being 42 Hz, 44.32 Hz, 46.78 Hz, 49.37 Hz, 52.11 Hz and 55.00 Hz. The notch filters reject signals at these frequencies. The signals from the filter bank are supplied to an absolute value generator which generates an absolute value for each signal. The absolute value of each signal is passed through a low pass filter bank. The low pass filter bank processes these absolute value signals providing a time weighted average for each signal. The low pass filter bank provides its output signals to a find frequency module. The find frequency module weights each signal from low pass filter bank by its corresponding notch filter center frequency and then takes an average to determine an estimated frequency at which undesirable coupling of missile structural vibrations through the missile's autopilot will occur. The estimated frequency is then supplied to the missile's autopilot which selects an internal notch filter coefficient to reject this frequency.

16 Claims, 6 Drawing Sheets

ADAPTIVE BODY-BENDING ESTIMATOR FOR USE WITH A MISSILE DURING FLIGHT

BACKGROUND OF THE INVENTION

1. Field of the Invention

This invention relates generally to apparatus for compensating for the structural vibration of a missile in flight. More particularly, the present invention relates to an adaptive body-bending estimator which will substantially reduce the amount of undesirable energy passed through the autopilot during flight.

2. Description of the Prior Art

During flight a missile passively vibrates at its structural natural frequencies. Generally, this passive vibration is not a problem, unless the missile's autopilot couples the missile body sensors with the control actuation system of the missile. The missile's autopilot coupling of the sensors with the actuators generates a feedback loop which actively amplifies missile vibrations. The amplified missile vibration can adversely affect missile performance during flight which may result in the missile missing its target. For example, missile vibrations can cause degradation in seeker performance, reduction in the range of the missile, and accelerated consumption of the missile actuation system's energy source.

A solution used in the past to solve this problem is to utilize notch filters to reduce the amount of undesirable energy passed through the autopilot. This approach, however, requires either (1) a prior knowledge of the structural frequencies of the missile, or (2) an estimation technique to identify the correct frequencies during the missile's flight.

Adjustable notch frequencies scheduled as a function of time generally work whenever a missile's structural frequencies are known and well characterized. Unfortunately, accurate predictions of the missile's structural frequencies are generally not available. This is especially true for missile developmental programs which may include uncertainties in the frequency profile due to inadequacies in testing and computer modeling.

Accordingly, there is a need for an adaptive body-bending estimator which compensates for the undesirable coupling of a missile's structural vibration through the missile autopilot which, in turn, adversely effects the missile performance during flight.

SUMMARY OF THE INVENTION

The present invention overcomes some of the disadvantages of the past, including those mentioned above, in that it comprises a relatively simple yet highly efficient and effective adaptive body bending estimator.

The adaptive body bending estimator comprises a band pass filter which receives a yaw accelerometer (BEND_ACCEL) signal from a missile's yaw accelerometer. The band pass filter, which has a bandpass of 25–70 hertz, rejects frequencies which are not of interest. The band-passed signal is then supplied to a notch filter bank comprising six logrithmically-spaced notch filters within a frequency range of between 42 hertz and 55 hertz. The six notch filters of the notch filter bank are centered at different frequencies, the frequencies being 42 Hz, 44.32 Hz, 46.78 Hz, 49.37 Hz, 52.11 Hz and 55.00 Hz. The notch filters reject signals at these frequencies. The signals from the filter bank are supplied to an absolute value generator which provides an absolute value for each of the six signals. The absolute value of each signal is passed through a low pass filter bank. The low pass filter bank processes these absolute value signals providing a time weighted average for each signal. The low pass filter bank provides its output signals to a find frequency module. The find frequency module weights each signal from low pass filter bank by its corresponding notch filter center frequency and then takes an average to determine an estimated frequency at which undesirable coupling of missile structural vibrations through the missile's autopilot will occur. The estimated frequency is then supplied to the missile's autopilot which selects the internal notch filter coefficient within the autopilot to reject this frequency.

DETAILED DESCRIPTION OF THE PREFERRED EMBODIMENT

Figure 1:
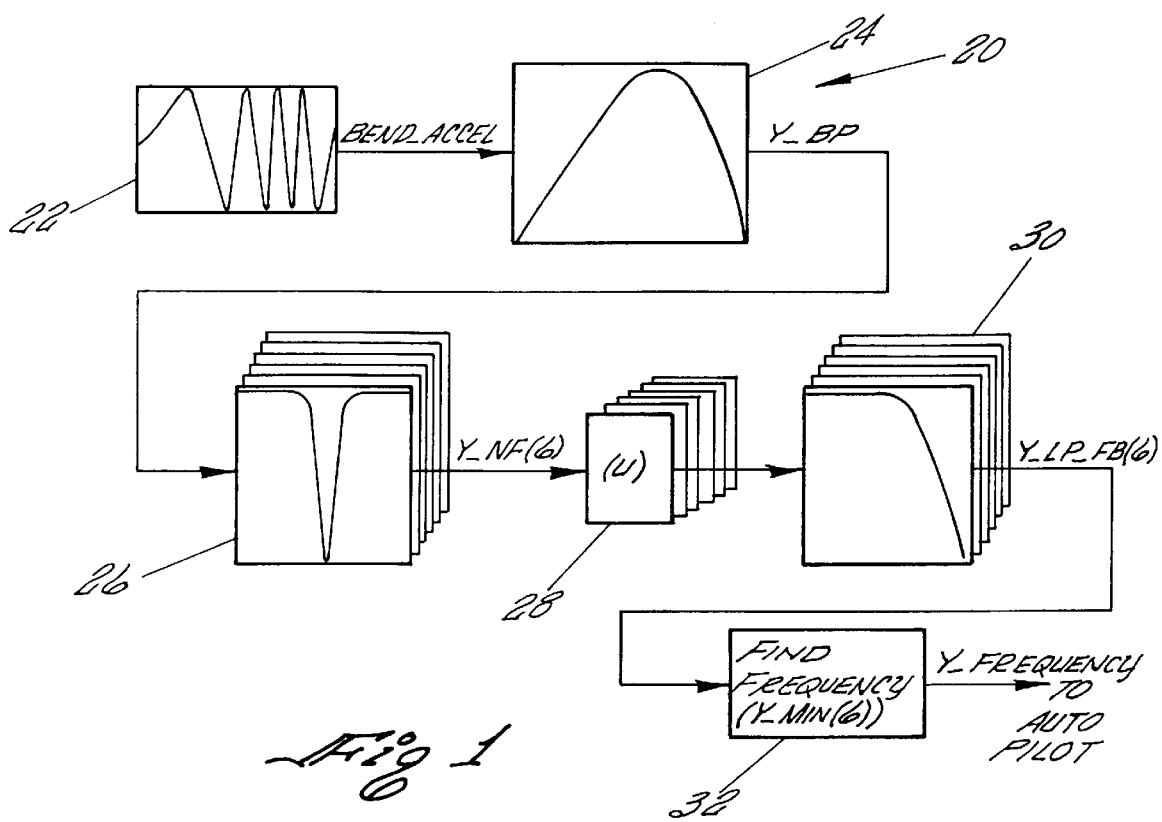
FIG. 1 is a schematic diagram illustrating the adaptive body-bending estimator comprising the present invention.

Referring first to FIG. 1, there is shown an adaptive body-bending estimator, designated generally by the reference numeral 20, which adaptively estimates the resonate frequencies of a missile during flight. These estimates are used to mitigate the undesirable coupling of structural vibrations through the missile's autopilot which can adversely effect missile performance during flight.

The missile's yaw accelerometer 22 generates a yaw accelerometer (BEND_ACCEL) signal which is the sensed yaw acceleration of the missile during flight. The yaw accelerometer signal is supplied to a third order band pass filter 24 which has a bandpass of 25–70 hertz. Band pass filter 24 rejects the frequencies which are not of interest. The routine in the software of Appendix A which performs the band pass filter function is BANDPASS. FOR. A high pass 3rd order Butterworth filter and a low pass 3rd order Butterworth filter are utilized by the is routine to provide bandpass of 25–70 hertz.

The band-passed (Y_BP) signal is supplied to a notch filter bank 26 comprising six logrithmically-spaced notch filters within a frequency range of between 42 hertz and 55 hertz. The frequency range of between 42 hertz and 55 hertz for the six notch filters of notch filter bank 26 is the expected region of concern for undesirable coupling of structural vibrations through the missile's autopilot. The six notch filters of notch filter bank 26 are centered at different frequencies, the frequencies being 42 Hz, 44.32 Hz, 46.78 Hz, 49.37 Hz, 52.11 Hz and 55.00 Hz. These frequencies are set forth in the routine BB_PARAMS. FOR which includes most of the coefficients for the filters used in the adaptive body-bending estimator 20 of FIG. 1. Notch filter bank 26 also has a zeta (damping ratio) of 0.13 .

To illustrate the operation of notch filter bank 26, if a signal provided to filter bank 26 has a resonate frequency of 42 hertz, the notch filter of bank 26 centered at 42 hertz will attenuate or reject this frequency. The routine in the software of Appendix A which performs the notch filter bank function is NOTCHES. FOR.

It should be noted that narrow bandpass filters may be used in place of the six notch filters of notch filter bank 26.

The signals from the six notch filters of filter bank 26 are supplied to an absolute value generator 28 which generates an absolute value for each of the six signals from notch filter bank 26. The absolute value of each signal is supplied to a second order low pass filter bank 30 which has six low pass filters, a natural frequency wn of 0.3 Hz and a damping ratio of one. Low pass filter bank 30 processes these absolute value signals providing a time weighted average for each signal. The routine in the software of Appendix A which performs the low pass filter bank function is LP_FILTER. C.

Low pass filter bank 30 provides its output signals to a find frequency module 32 which estimates frequency using an algorithm which is set forth in the routine FIND_FREQ. FOR of Appendix A. The find frequency module 34 weights each signal from low pass filter bank 30 by its corresponding notch filter center frequency and then takes an average to determine an estimated frequency at which undesirable coupling of missile structural vibrations through the missile's autopilot will occur. The estimated frequency is then supplied to the missile's autopilot which selects an internal notch filter coefficient to reject this frequency.

Figure 2:
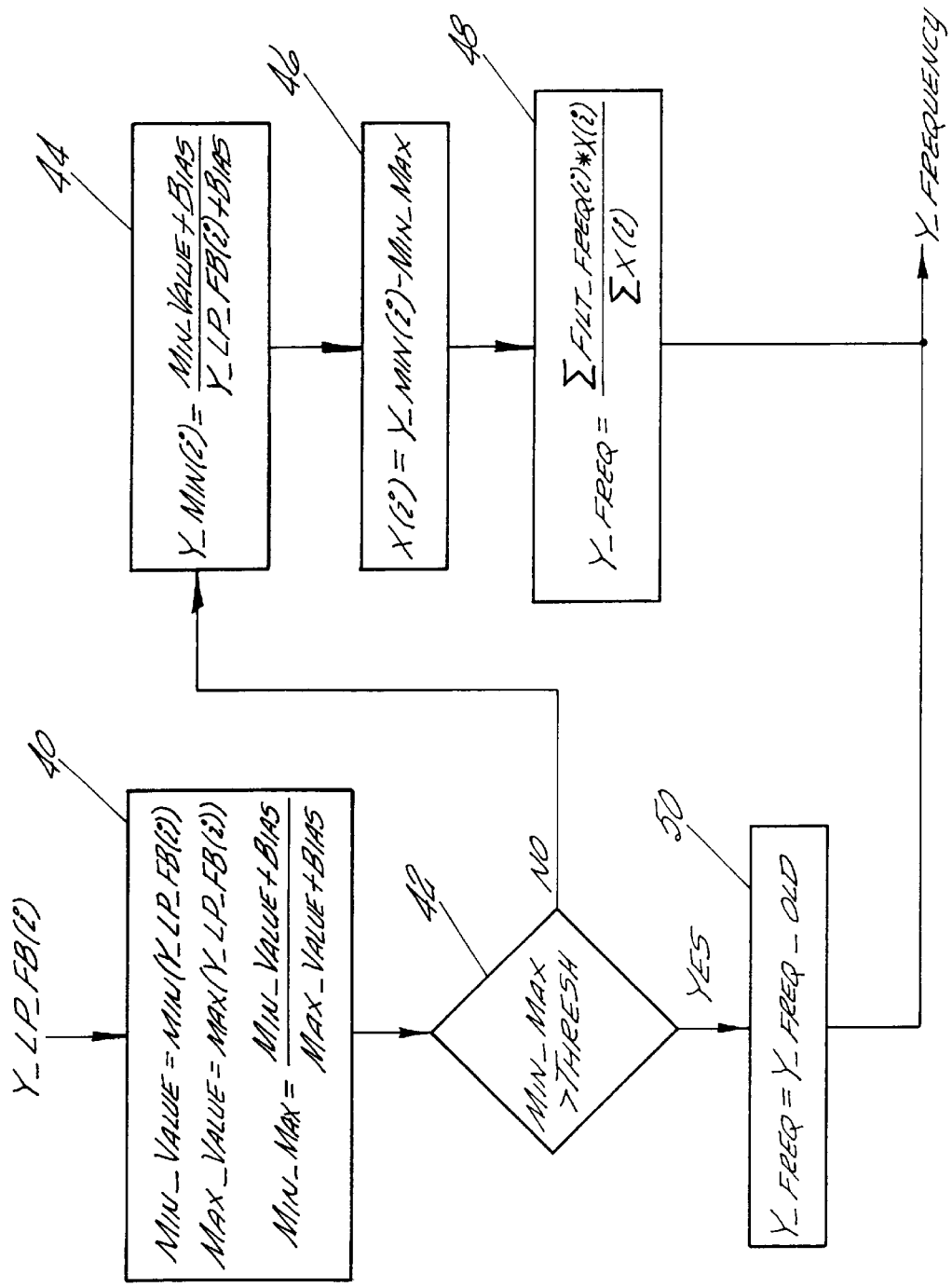
FIG. 2 is a flow chart illustrating the FIND_FREQUENCY module of the software of Appendix A.

Referring to FIGS. 1 and 2, the flow chart of FIG. 2 depicts how the FIND_FREQUENCY module of the software of Appendix A calculates the low-passed, notch-filtered signals ($Y_{13}$ LP_FB(6)). As illustrated in the flow chart of FIG. 2, the values of the notch-filtered signals are first sorted to determine the filters with the smallest and largest outputs (program step 40). Next, the vector Y_MIN(6) is created by multiplying the inverse of each notched filtered signal by the smallest value so that all the signals are scaled to be less than or equal to one (program step 44). This scaling ensures that the notch filter of notch filter bank 24 which is performing the best at rejecting noise has a value of one. Proceeding to program step 46, the relative difference between each signal is increased by subtracting the smallest scaled value, which is provided by the worst performing filter, from each signal.

It should be noted that a sorting process can determine the smallest scaled value or the smallest scaled value can be calculated by taking the ratio between the smallest and the largest values provided by the low-pass filter bank 30 (as shown in program step 40). Removing the smallest scaled signal from each signal effectively removes the output of the worst performing filter from further calculations.

These adjusted signals X(i) are then multiplied by their respective frequencies. The resulting weighted signals are summed. The estimated frequency Y_freq which is set forth below is calculated by dividing the summed weighted signals by the summed adjusted signals to provide a weighted average (program step 48).

$$Y\_freq = \frac{\Sigma \text{Filt\_freq}(i) \cdot X(i)}{\Sigma X(i)} \quad (1)$$

where:

$$\frac{\Sigma \text{Filt\_freq}(i) \cdot X(i)}{\Sigma X(i)}$$

is a frequency weighted average of the outputs of each of the low-pass filters of low pass filter bank 30.

The estimated frequency Y_FREQ at time zero should be set to the best guess available for the loaded condition of the missile.

Additional biases and thresholds are also used to keep the algorithm from estimating solely on instrument noise. For the particular missile under test using the software of Appendix A, the estimation scheme is set to require at least 0.02 g's of body bending before it performs its estimation. If there is insufficient signal or if the signal is broad band, and is attenuated by all the filters nearly equally, then the previous value is used (program step 50).

The method for choosing the "Bias"0 and "Thresh" values used in the Find Frequency module of Appendix A is set forth below. This method is based on choosing values which will guarantee the smallest acceleration signal that will "trigger" a filter change. A sine wave of fixed amplitude with a slowly moving frequency over the pass-band of interest is utilized. This is a best case analysis in the sense that whenever the spectrum of the input is spread over more than one frequency, the g-level required to initiate frequency estimation is higher than that predicted here.

The equation of determining Thresh is as follows:

$$\frac{\text{Min\_value} + \text{Bias}}{\text{Max\_value} + \text{Bias}} = \text{Thresh} \quad (2)$$

where:

Min_value=min(Y_LP_FB(1) . . . Y_LP_FB(6))
Max_value=max(Y_LP_FB(1) . . . Y_LP_FB(6))
Bias=a minimal value The DC gain of each Y_LP_FB(i) signal is inversely proportional to how well the ith notch filter of filter bank 2 rejects the input signal. Each signal is obtained by multiplying the amplitude of the assumed sinusoidal input acceleration by the gains associated with the band-pass filter 24 and the ith notch filter of filter bank 26 and then multiplying by $2\pi$ to account for rectification. The purpose of each low-pass filter within low pass filter bank 30 is to extract the DC component of the signal and also to create a sliding window for processing the data. If the low-pass filter is too fast it will not average enough data. If the low pas filter is too slow, there will be a significant time delay in the estimate. This signal path is expressed in the following equation:

$$Y\_LP\_FB = \frac{gl \cdot 2}{\pi} \cdot Kn \cdot Q \quad (3)$$

where:

gl=g-level of the input acceleration

Q=attenuation due to band-pass filter

Kn=attenuation due to the notch filters

Figure 3:
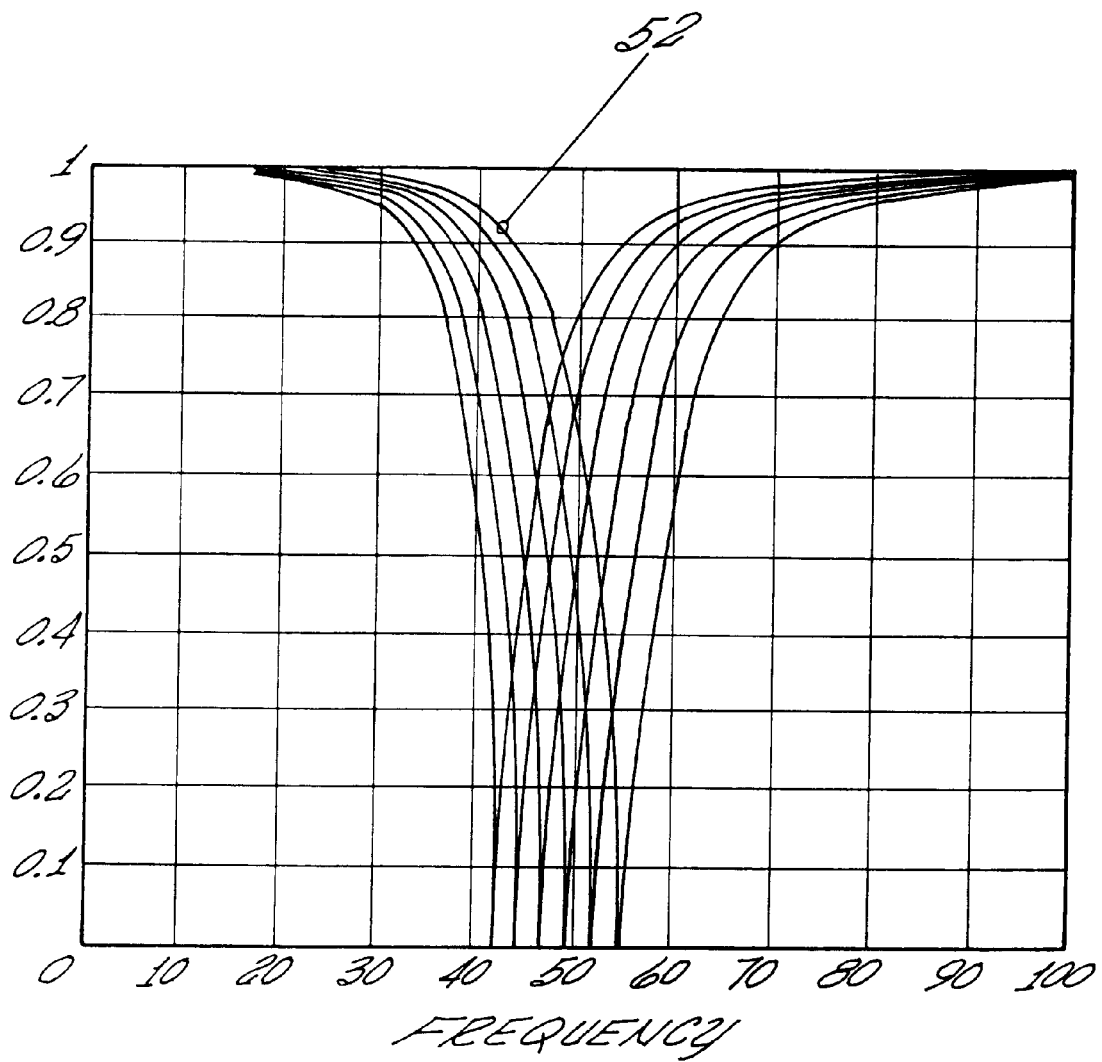
FIG. 3 depicts the various gains of the filters of the notch filter bank of FIG. 1.

The following logic is used to calculate the minimum value to trigger the filter. First, the assumption is made that the g-level remains constant and that the gain Q is equal to one, over the entire filter bank. Therefore, the difference in output is related only to the difference in attenuation of the different notch filters of filter bank 26. The maximum difference in the values of Y_LP_FB(i) occurs when the input signal frequency is at the center frequency of one of the notch filters at one of the extreme ends of filter bank 26. The output associated with this signal is essentially zero while the output of the filter at the other extreme of filter bank 26 is at its maximum. FIG. 3 depicts the various gains of the filters of notch filter bank 26. The "Bias" term in equation 1 can be derived by incorporating the above observations into equation 2 and then substituting into equation 1. It should be noted that "Min_Value" goes to zero and "Max Value" is the right-hand-side terms of equation 2. The equation for Bias is determined as follows:

$$\text{Bias} = \frac{2 \cdot gl \cdot Kn \cdot Q \cdot \text{Thresh}}{\pi \cdot (1 - \text{Thresh})} \quad (4)$$

The following values were chosen for equation 3: Q was chosen to be 1.0 since the band-pass filter 24 did not significantly attenuate the signal over the region of interest. The minimum allowable g-level was chosen to be 0.02 g's. This is several times larger than the noise level of the accelerometer in the inertial measurement unit. The gain Kn is 0.92 at 42 Hz which is indicated by reference numeral 52 in FIG. 3. The "Thresh" value was arbitrarily chosen to be 0.95. The "Bias" value then is calculated to be 0.22. These calculations are based on the theoretically smallest g-level that could trigger a filter change. If the frequency changes rapidly or the input frequency is not a pure sinusoid, the g-level to prompt a filter change will be greater than calculated.

ADAPTIVE NOTCH EXAMPLES

The following section shows test results utilizing the adaptive body-bending estimator 20. The plots illustrate both simulation results and the results from an actual test firing of a missile.

Figure 4:
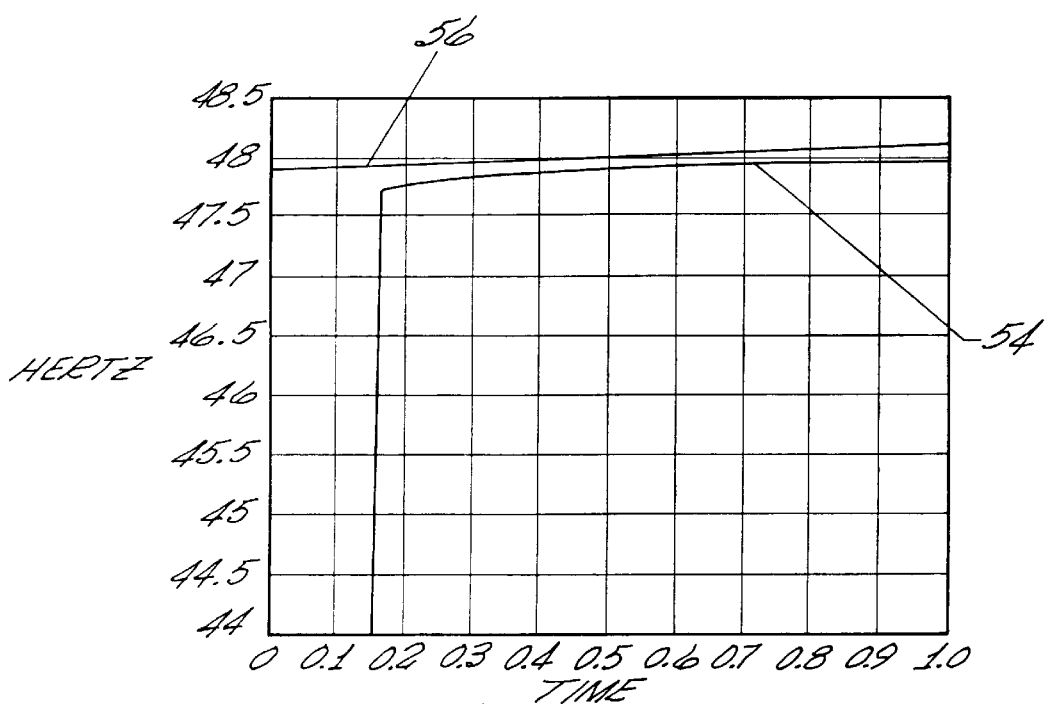
FIGS. 4–10 illustrates plots which depict test results of the operation of the adaptive body-bending estimator of FIG. 1 under simulated and the actual test firing of a missile.

Referring to FIGS. 1 and 4, FIG. 4 illustrates the results of a 1-g sinusoidal input at approximately 48 Hz for the duration of one second. Plot 54 shows that at this g-level it takes just over 0.15 seconds to begin the estimation. Adaptive body-bending estimator 20 then quickly estimates the correct frequency to within approximately 0.1 Hz, with the correct frequency being depicted by plot 56.

Figure 5:
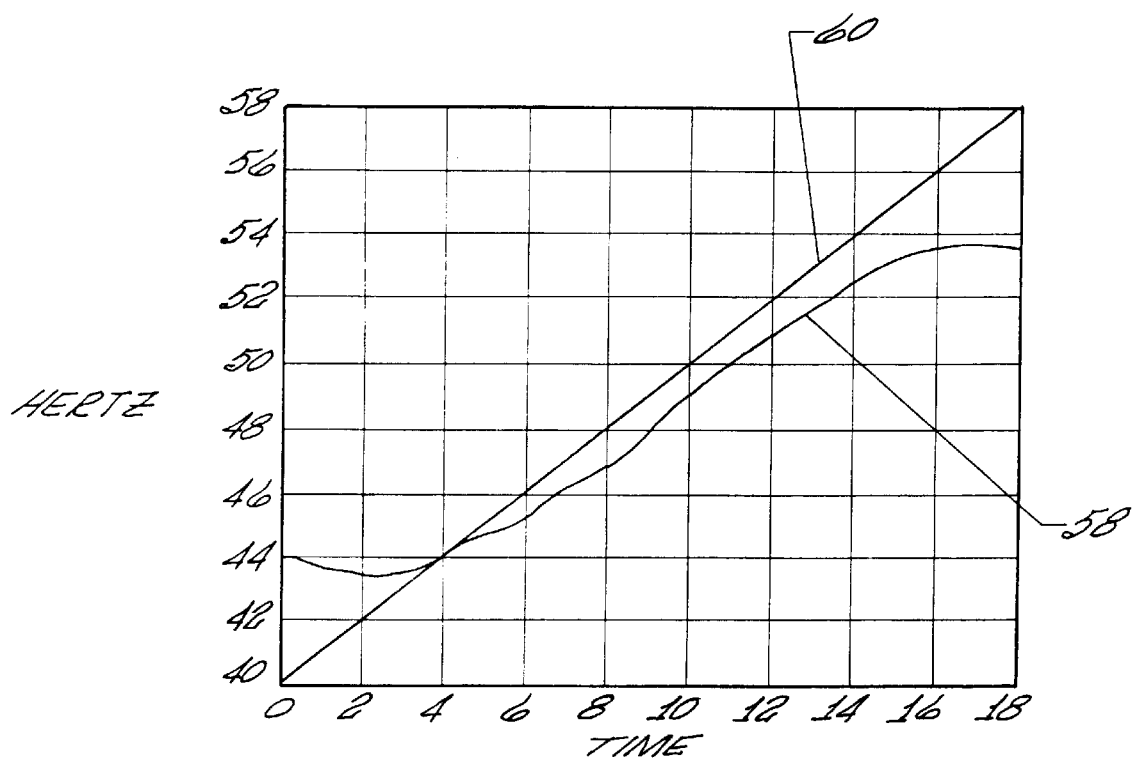

Referring to FIGS. 1 and 5, FIG. 5 shows the results of a 1-g sinusoidal input signal starting at a frequency of 40 Hz and ending at 58 Hz over 18 seconds. The estimator 20 begins its plot at the initial value of 44 Hz and intersects the actual frequency (depicted by plot 60) at 43.5 Hz. The error then remains within 1.5 Hz until the actual frequency 60 goes beyond 53 Hz. The final estimated frequency 58 is seen to asymptotically approach 53.4 Hz. Plot 58 illustrates several aspects of the estimation scheme. First, because it averages the results of the notch filters of filter bank 26, the estimated frequencies will always be between the minimum and maximum notch filter frequencies. In other words, frequency extrapolation is not possible. Filter spacing must be done such that the expected frequencies lie within the range of the filter bank 26. Second, the low-pass filter bank 30 causes a delay in the estimation scheme.

Figure 6:
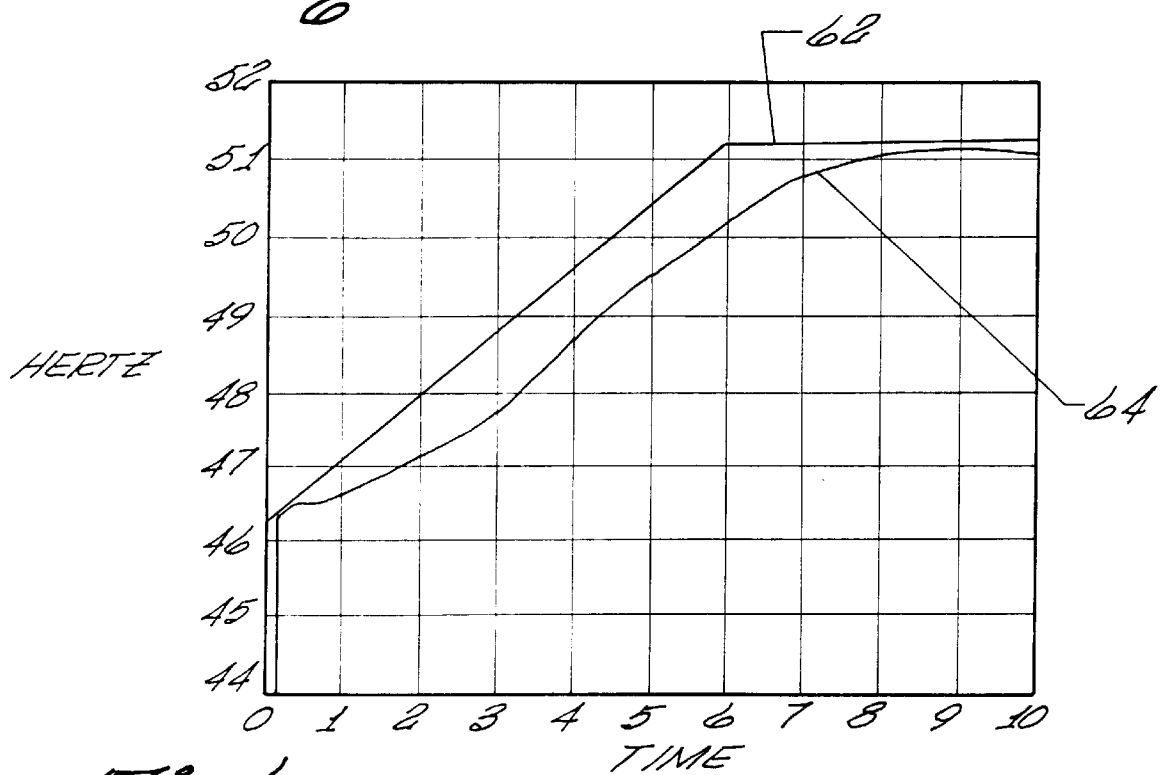

Referring to FIGS. 1 and 6, FIG. 6 represents the first bending mode time history of a typical missile flight. The sinusoid 62 starts at 46.2 Hz and ends 6 seconds later at 51.2 Hz Sinusoid 62 then continues at 51.2 Hz for another 4 seconds. The estimated value (plot 64) and the actual value (plot 62) are within 1 Hz for the entire flight.

Figure 7:
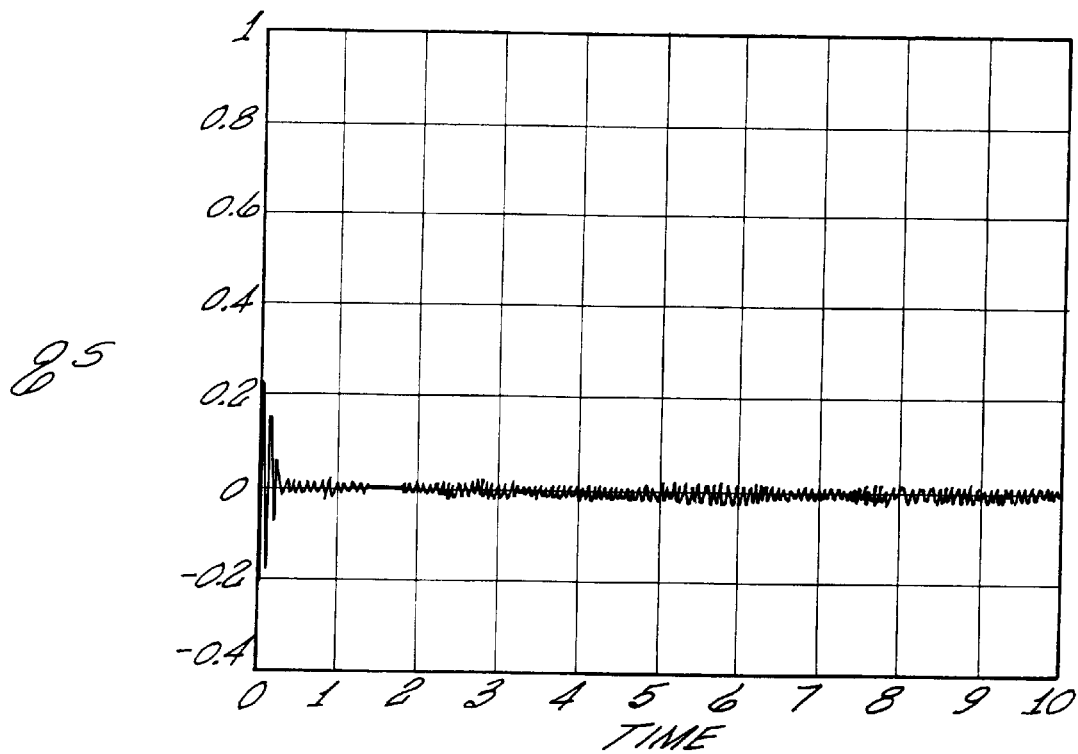
Figure 8:
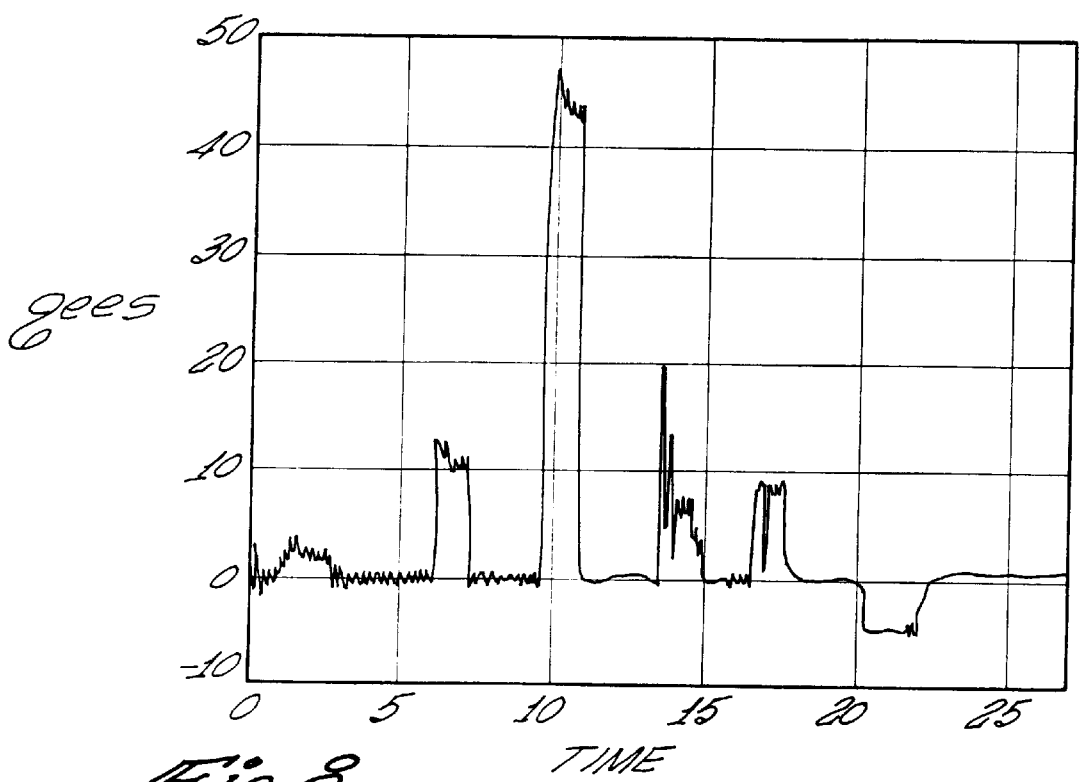
Figure 9:
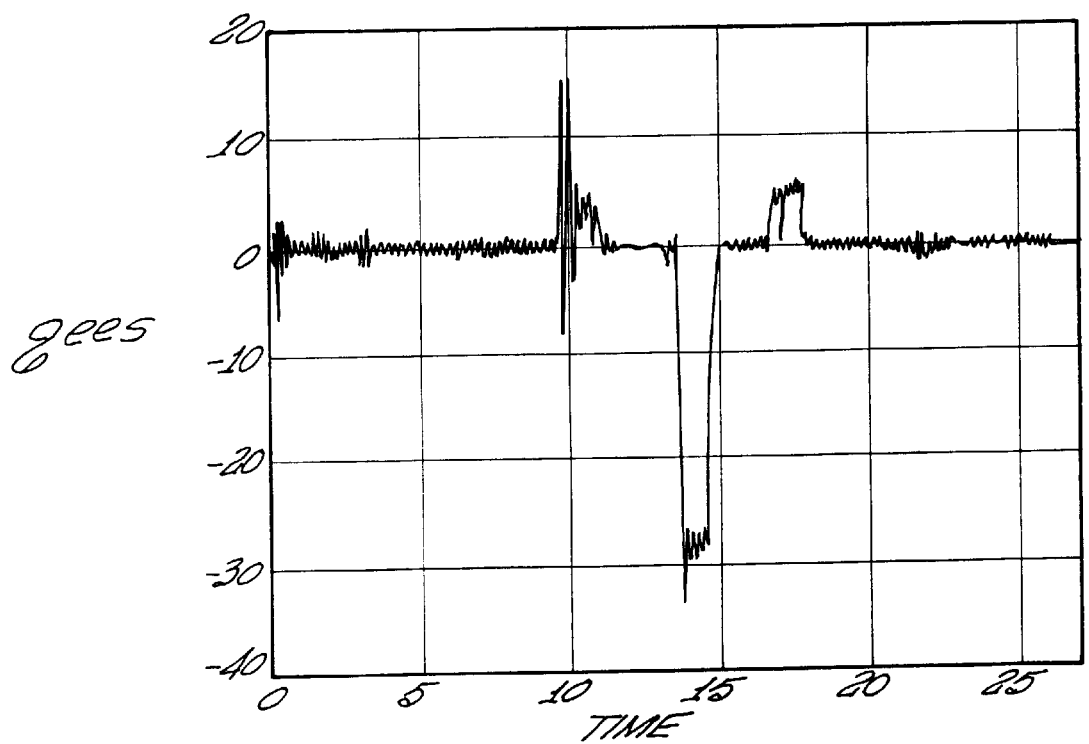
Figure 10:
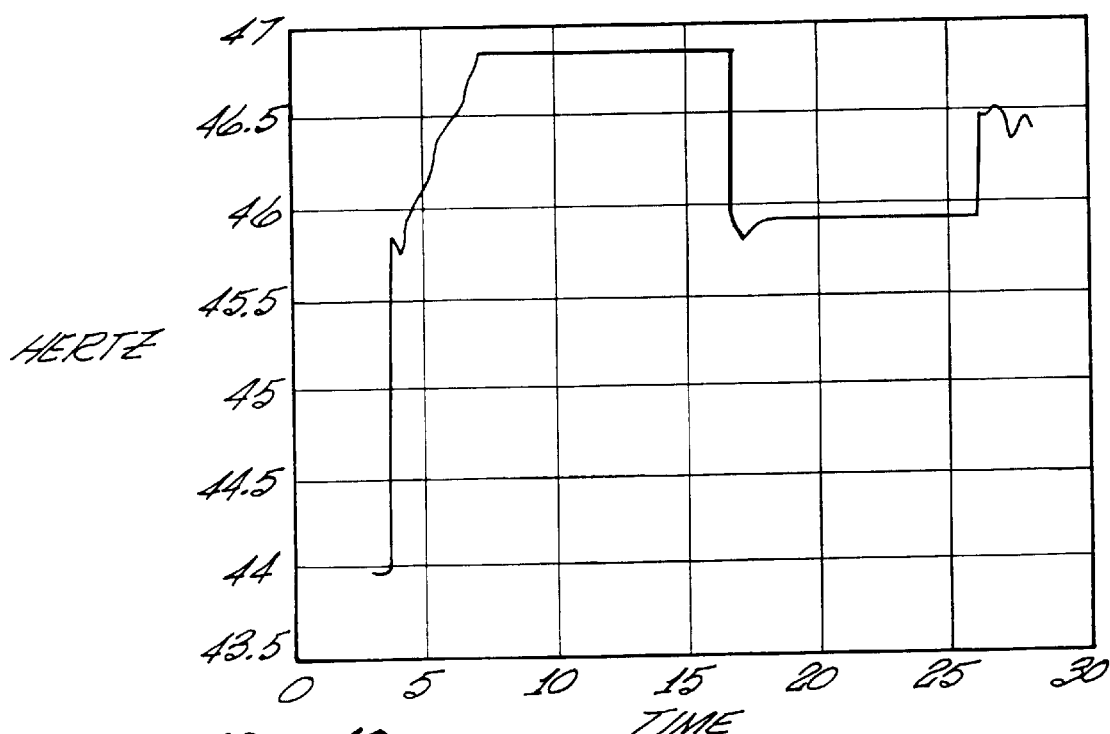

Referring to FIGS. 1, 6 and 7, FIG. 7 illustrates a 1-g sinusoidal input attenuated by a notch filter of filter bank 24 whose coefficients were selected by the frequency estimates shown in FIG. 6. The signal was attenuated by at least 35 dB for all but the first 0.3 seconds of the flight of the missile. Referring to FIGS. 8, 9 and 10, FIG. 8 through 10 show results from an actual missile flight. FIGS. 8 and 9 show the IMU (inertial measurement unit) outputs of both the pitch channel acceleration and the yaw channel acceleration, respectively. The plots of FIGS. 8 and 9 show little evidence of first-mode oscillations. It should be noted that the estimator 20 is not enabled until approximately 3 seconds into flight due to the missile software architecture. The large oscillations around 9 and 13.5 seconds are dominated by frequencies below the first structural mode. At 9 seconds an approximately 7 Hz dominant oscillation in body roll attitude is observed.

FIG. 10 shows the estimated first-mode frequency as a function of time. The pre-flight calculated frequencies from lab testing were bracketed between 44.5 and 51 Hz while the estimated frequencies during flight were between 44 and 46.8 Hz as depicted in plot 10 (FIG. 10).

It should be understood that the adaptive body-bending estimator 20 comprising the present invention is adapted for use with multiple missiles which may have different parameters.

From the foregoing, it may readily be seen that the present invention comprises a new and unique adaptive body-bending estimator for use with a missile in flight which constitutes a considerable improvement over the known prior art. Obviously, many modifications and variations of the present invention are possible in light of the above teachings. It is therefore to be understood that within the scope of the appended claims the invention may be practiced otherwise than as specifically described.

Navy Case No. 82081

APPENDIX A

```
!**********************************************************************
!**********************************************************************
!*
!*   FILENAME:    BB_EST_TEST.FOR
!*   MODULE:      DRIVER
!*   DATE:        3/18/99
!*   AUTHOR:      ALLEN ROBINS, NAWCWPNS, China Lake, CA
!*                RobinsLA@navair.navy.mil
!*
!*   DESCRIPTION:
!*       This module is the main driver for the body bending estimation
!*       algorithm.
!*
!*   INPUTS:
!*        BEND_ACCEL   accelerometer data at 400 Hz to be used in
!*                     estimation (gs)
!*        TIME         time from motor ignition (s)
!*
!*
!*   OUTPUTS:
!*        Y_BP      band passed signal (gs)
!*        Y_MIN(N)  scaled signals (unitless)
!*        Y_FREQ    estimated frequency (Hz)
!*
!*   INCLUDE FILES:
!*
!*   EXTERNAL MODULES CALLED:
!*        BEND_EST(...)     body bending estimator algorithm
!*
!*
!**********************************************************************
!**********************************************************************!

PROGRAM BB_EST_TEST

IMPLICIT NONE

REAL TF, FREQ1, FREQ2, FREQ
      REAL T_CHIRP, FREQ_ACTUAL, AMP

REAL TIME /0.0/    ! simulation time (s)
      REAL OMEGA /0.0/   ! chirp frequency (rad/s)
      REAL PI /3.14159/  ! pi
      REAL DT / 0.0025/  ! time step 1/400

REAL SCALE_FACTOR /1.0/  ! used to scale acceleration data
      INTEGER I, N , FLAG !* variables needed for body bending estimation *!

REAL   Y_FREQ
```

Navy Case No. 82081

```
REAL   BEND_ACCEL, Y_BP, Y_MIN(6)

REAL   Y_NF(6), Y_LP_FB(6)

OPEN(UNIT= 10, FILE="RESULTS.DAT",STATUS="UNKNOWN")

WRITE(*,*)"READ INPUT.DAT (1) OR USE CHRIP (2) "
 READ(*,*) FLAG
 IF (FLAG .EQ. 2) THEN
  WRITE(*,*)"INPUT T FINAL   "
   READ(*,*) TF
    WRITE(*,*) "ENDING TIME FOR CHIRP     "
    READ(*,*) T_CHIRP
  WRITE(*,*) "START FREQ (hZ)   "
   READ(*,*) FREQ1
   WRITE(*,*) "ENDING FREQ (hZ)   "
   READ(*,*) FREQ2
   WRITE(*,*) "AMPLITUDE  "
   READ(*,*) AMP
ELSE
 OPEN(UNIT = 8,FILE = "INPUT.DAT", STATUS = "OLD")
 READ(8,*) TF
END IF

WRITE(10,*) "11"              !* number of labels *!
WRITE(10,*) "TIME"
WRITE(10,*) "Y_BP"
WRITE(10,*) "Y_MIN(1)"
WRITE(10,*) "Y_MIN(2)"
WRITE(10,*) "Y_MIN(3)"
WRITE(10,*) "Y_MIN(4)"
WRITE(10,*) "Y_MIN(5)"
WRITE(10,*) "Y_MIN(6)"
WRITE(10,*) "Y_FREQ"
WRITE(10,*) "BEND_ACCEL"
WRITE(10,*) "FREQ"

CALL BEND_ESTIMATE_IC (Y_FREQ)   ! body bending estimator ICS

N = TF/DT

DO I = 1, N

TIME = TIME + DT

IF (FLAG .EQ.2) THEN    ! create chirp

IF (TIME .LE. T_CHIRP) THEN

FREQ_ACTUAL = (FREQ1 + TIME/T_CHIRP *(FREQ2 - FREQ1) )

FREQ = (FREQ1 + TIME/T_CHIRP *(FREQ2 - FREQ1) * 0.5)
```

25

Navy Case No. 82081

```
      OMEGA = FREQ*2*PI

BEND_ACCEL = AMP*SIN(OMEGA*TIME)

ELSE

OMEGA = FREQ_ACTUAL*2*PI

BEND_ACCEL = AMP*SIN(OMEGA*TIME)

ENDIF

ELSE      ! read data from file
    READ(8,*)BEND_ACCEL
      BEND_ACCEL = BEND_ACCEL*SCALE_FACTOR

END IF

CALL BEND_ESTIMATE(BEND_ACCEL, Y_BP, Y_MIN, Y_FREQ)

WRITE(10,*)TIME, Y_BP, Y_MIN(1),Y_MIN(2),Y_MIN(3),Y_MIN(4),
 &         Y_MIN(5),Y_MIN(6), Y_FREQ, BEND_ACCEL, FREQ_ACTUAL

END DO

!* clean up *!

IF (FLAG .EQ. 2) CLOSE(8)
CLOSE(10)

STOP
END
```

26

Navy Case No. 82081

```
!**********************************************************************
!**********************************************************************
!*
!* FILENAME:    BB_EST_GNS.CMN
!* DATE:        3/18/99
!* AUTHOR:      ALLEN ROBINS, NAWCWPNS, China Lake, CA
!*              RobinsLA@navair.navy.mil
!*
!* DESCRIPTION:
!*     This common block is used for the body bending estimator
!*     routines
!*
!* HISTORY: V1
!*
!**********************************************************************
!**********************************************************************!

COMMON /BB_EST_GNS/
     &     K1_HP,C1_HP,C2_HP,C3_HP,
     &     D1_HP,D2_HP,D3_HP,
     &     K1_LP,C1_LP,C2_LP,C3_LP,
     &     D1_LP,D2_LP,D3_LP,
     &     K1_NFFB(6),C1_NFFB(6),C2_NFFB(6),
     &     D1_NFFB(6),D2_NFFB(6),
     &     K1_LPFB,C1_LPFB,C2_LPFB,
     &     D1_LPFB,D2_LPFB,
     &     BIAS, THRESH, NF_FILT_FREQS(6),Y_FREQ_0

!* discrete HP filter  coefficients *!

REAL K1_HP,C1_HP,C2_HP,C3_HP
      REAL D1_HP,D2_HP,D3_HP

!* discrete LP filter  coefficients *!

REAL K1_LP,C1_LP,C2_LP,C3_LP
      REAL D1_LP,D2_LP,D3_LP

!* discrete NF filter coefficients   *!

REAL K1_NFFB,C1_NFFB,C2_NFFB
      REAL D1_NFFB,D2_NFFB

!* discrete LPFB filter  coefficients *!

REAL K1_LPFB,C1_LPFB,C2_LPFB
      REAL D1_LPFB,D2_LPFB

!* parameters for FIND_FREQ  *!

REAL BIAS, THRESH, NF_FILT_FREQS, Y_FREQ_0
```

Navy Case No. 82081

```
!***********************************************************************
!***********************************************************************
!*
!*  FILENAME:   BB_PARAMS300.FOR
!*  DATE:       4/15/99
!*  AUTHOR:     ALLEN ROBINS, NAWCWPNS, China Lake, CA
!*              RobinsLA@navair.navy.mil
!*
!*  DESCRIPTION:
!*      This is a block data routine of most of the coefficients
!*      used in the body-bending estimator. All the filters are
!*      discrete sampled at 400 Hz
!*
!*  INCLUDE FILES:
!*      BB_EST_GNS.CMN
!*
!*  HISTORY:
!*
!***********************************************************************
!***********************************************************************!

BLOCK DATA BB_PARAMS

INCLUDE 'BB_EST_GNS.CMN'

!* ***** BAND_PASS filter coefficients ********************    *!

!* get  3rd order filter coeff. - using pre-warped transform   *!
      !* 25 Hz Butterworth filter (zeta = 0.5)                       *!

DATA K1_HP /  0.673479 /
      DATA C1_HP / -3.0      /
      DATA C2_HP /  3.0      /
      DATA C3_HP / -1.0      /
      DATA D1_HP / -2.219169 /
      DATA D2_HP /  1.715118 /
      DATA D3_HP / -0.453546 /

!* get  3rd order filter coeff. - using pre-warped transform   *!
      !* 70 Hz Butterworth filter (zeta = 0.5)                       *!

DATA K1_LP /  0.071761 /
      DATA C1_LP /  3.0      /
      DATA C2_LP /  3.0      /
      DATA C3_LP /  1.0      /
      DATA D1_LP / -0.868221 /
      DATA D2_LP /  0.534405 /
      DATA D3_LP / -0.092094 /

!* ********** NOTCHES coefficients ************************* *!

!* logarithmically spaced notch filter frequencies HZ
```

Navy Case No. 82081

```
!  calibrated values for 400 Hz sample rate with a pre-warped
!  transformation  , zeta = 0.13
!42.00, 44.32, 46.78, 49.37, 52.11, 55.00  *!

DATA (K1_NFFB(I), I = 1,6)
& /0.9262,  0.9230,   0.9198,   0.9166,   0.9133,   0.9100 /

DATA (C1_NFFB(I), I = 1,6)
& /-1.5803, -1.5345,  -1.4838,  -1.4280,  -1.3665,  -1.2989/

DATA (C2_NFFB(I), I = 1,6)
& /1.0000,  1.0000,   1.0000,   1.0000,   1.0000 ,  1.0000 /

DATA (D1_NFFB(I), I = 1,6)
& /-1.4637, -1.4164,  -1.3649,  -1.3089,  -1.2481,  -1.1820/

DATA (D2_NFFB(I), I = 1,6)
& /0.8524,  0.8461,   0.8396,   0.8331,   0.8266,   0.8201/

!* ******** LP_FILTERS *********************************    *!

!* calculate low filter gains -- using tustin transformation *!
!* if pre-calculated coefficients are used  they need to    *!
!* have at least 8 places of accuracy to work correctly     *!
!* (note :the decimal portions of D1 and D2 must be different) *!

!* coefficients for 0.3 Hz low-pass with zeta = 1           *!

DATA K1_LPFB /   5.525604e-006 /
 DATA C1_LPFB /   2.0           /
 DATA C2_LPFB /   1.0           /

DATA D1_LPFB /  -1.990597      /
 DATA D2_LPFB /   0.990619      /

!* ************ FIND_FREQ parameters ********************* *!

!* takes at least 0.02 gs to trigger a change *!

DATA BIAS  / 0.22 /
 DATA THRESH  / 0.95 /

!* notch filter frequencies  *!

DATA ( NF_FILT_FREQS(I), I = 1,6 )
 &            / 42.00, 44.32, 46.78, 49.37, 52.11, 55.00/

DATA Y_FREQ_0 / 44.0 /     !* starting estimate (HZ) *!

END
```

Navy Case No. 82081

```
!***********************************************************************
!***********************************************************************
!*
!* FILENAME:    BB_EST.FOR
!* MODULE:      BEND_ESTIMATE(...)
!* DATE:        3/18/99
!* AUTHOR:      ALLEN ROBINS, NAWCWPNS, China Lake, CA
!*              RobinsLA@navair.navy.mil
!*
!* DESCRIPTION:
!*     This module is the main driver for the body bending estimation
!*     algorithm.  The input to the estimator is data from one of the
!*     accelerometers (BEND_ACCEL) and the output is the estimated
!*     filter frequency (Y_FREQ)
!*
!* INPUTS:
!*      BEND_ACCEL   acceleration input to body-bending estimator (gs)
!*
!* OUTPUTS:
!*     Y_BP      band passed signal (gs)
!*     Y_MIN(N)  scaled signals (unitless)
!*     Y_FREQ    estimated filter frequency (Hz)
!*
!* INCLUDE FILES:
!*
!* EXTERNAL MODULES CALLED:
!*     BANDPASS(...)      high pass filter
!*     NOTCHES(...)       notch filter bank
!*     LP_FILTERS(...)    low pass filter bank with squared input
!*     FIND_FREQ(...)     estimates bending frequency
!*
!* HISTORY:
!*
!***********************************************************************
!*********************************************************************** *!

SUBROUTINE BEND_ESTIMATE(BEND_ACCEL, Y_BP, Y_MIN, Y_FREQ)

IMPLICIT NONE

REAL    Y_FREQ

REAL   BEND_ACCEL, Y_BP, Y_MIN(6)

REAL   Y_NF(6), Y_LP_FB(6)

!* ********* filter calculations ************************************ *!

CALL BANDPASS     (BEND_ACCEL, Y_BP)

CALL NOTCHES      (Y_BP, Y_NF)

CALL LP_FILTERS   (Y_NF, Y_LP_FB)

CALL FIND_FREQ    (Y_LP_FB, Y_MIN, Y_FREQ)
```

Navy Case No. 82081

```
        RETURN
!* **********   initialization   section ************************ *!
        ENTRY BEND_ESTIMATE_IC (Y_FREQ)
        !* initialize all body bending estimator routines *!
        CALL BANDPASS_IC
        CALL NOTCHES_IC
        CALL LP_FILTERS_IC
        CALL FIND_FREQ_IC (Y_FREQ)
        RETURN
        END
```

Navy Case No. 82081

```
!*********************************************************************
!*********************************************************************
!*
!* FILENAME:    BANDPASS.FOR
!* MODULE:      BANDPASS(...)
!* DATE:        3/18/99
!* AUTHOR:      ALLEN ROBINS, NAWCWPNS, China Lake, CA
!*              RobinsLA@navair.navy.mil
!*
!* DESCRIPTION:
!*     This routine performs a band pass filter using both a high pass
!*     3rd order Butterworth Filter and a low-pass 3rd-order
!*     Butterworth Filter.
!*     It is the discrete form of the continuous filter shown below.
!*     discretization was done using the bilinear transformation.
!*
!*         S^3   / [(S+wn)(S^2 + 2*zeta*wn S + wn^2)]
!*         wn^3  / [(S+wn)(S^2 + 2*zeta*wn S + wn^2)]
!*
!* INPUTS:
!*     BEND_ACCEL    acceleration input to body-bending estimator (gs)
!*
!* OUTPUTS:
!*     Y_BP       filtered output (gs)
!*
!* INCLUDE FILES:
!*     BB_EST_GNS.CMN
!*
!* EXTERNAL MODULES CALLED: none
!*
!* HISTORY:
!*
!*********************************************************************
!*********************************************************************!

SUBROUTINE BANDPASS( BEND_ACCEL, Y_BP)

IMPLICIT NONE

INCLUDE 'BB_EST_GNS.CMN'

REAL BEND_ACCEL, Y_HP, Y_BP

REAL X1_HP,X2_HP,X3_HP     !* high pass filter states    *!

REAL X1_LP,X2_LP,X3_LP    !* low pass filter states     *!

REAL K1U                   !*   K1*INPUT                 *!

!* ********* filter calculation
************************************* *!

!* calculate high-pass filter   *!

K1U  = K1_HP*BEND_ACCEL
```

Navy Case No. 82081

```
        Y_HP = X1_HP + K1U

!* calculate new states *!

X1_HP = C1_HP*K1U + X2_HP - D1_HP*Y_HP
        X2_HP = C2_HP*K1U + X3_HP - D2_HP*Y_HP
        X3_HP = C3_HP*K1U         - D3_HP*Y_HP

!* calculate low-pass filter   *!

K1U  = K1_LP*Y_HP
        Y_BP = X1_LP + K1U

!* calculate new states *!

X1_LP = C1_LP*K1U + X2_LP - D1_LP*Y_BP
        X2_LP = C2_LP*K1U + X3_LP - D2_LP*Y_BP
        X3_LP = C3_LP*K1U         - D3_LP*Y_BP

RETURN

!* **********   initialization   section ********************** *!

ENTRY  BANDPASS_IC

!* initialize filter   *!

X1_HP = 0.0   !* initialize internal states  *!
        X2_HP = 0.0
        X3_HP = 0.0

X1_LP = 0.0   !* initialize internal states  *!
        X2_LP = 0.0
        X3_LP = 0.0

RETURN
        END
```

33

Navy Case No. 82081

```
!**********************************************************************
!**********************************************************************
!*
!* FILENAME:    NOTCHES.FOR
!* MODULE:      NOTCHES(...)
!* DATE:        3/18/99
!* AUTHOR:      ALLEN ROBINS, NAWCWPNS, China Lake, CA
!*              RobinsLA@navair.navy.mil
!*
!* DESCRIPTION:
!*     This routine performs a notch filer bank for a single input
!*     It implements difference equations for the S-domain transfer
!*     function shown below   -- it uses the prewarped transformation
!*     The filters are equally spaced logarithmically.
!*
!*              ( S^2 + wn^2 )/( S^2 + 2*zeta*wn*S + wn^2)
!*
!* INPUTS:
!*     Y_BP      signal from band pass filter (gs)
!*
!* OUTPUTS:
!*     Y_NF(N)   notch filtered outputs   (gs)
!*
!* INCLUDE FILES:
!*     BB_EST_GNS.CMN
!*
!* EXTERNAL MODULES CALLED: none
!*
!* HISTORY:
!*
!**********************************************************************
!**********************************************************************!

SUBROUTINE NOTCHES( Y_BP, Y_NF )

IMPLICIT NONE

INCLUDE 'BB_EST_GNS.CMN'

INTEGER  I, N

PARAMETER (N = 6)

REAL   Y_BP , Y_NF(N)

REAL   X1(N),X2(N)          !* filter states         *!

REAL   K1U                  !*   K1*INPUT            *!

!* ********** filter calculation ************************************ *!
      DO I = 1,N

K1U    = K1_NFFB(I) * Y_BP
        Y_NF(I) = X1(I) + K1U
```

Navy Case No. 82081

```
        !* calculate new states *!

X1(I) = C1_NFFB(I)*K1U + X2(I) - D1_NFFB(I)*Y_NF(I)
        X2(I) = C2_NFFB(I)*K1U         - D2_NFFB(I)*Y_NF(I)

END DO

RETURN

!* *********   initialization   section ********************* *!

ENTRY   NOTCHES_IC

!* initialize filters   *!

DO I = 1,N

X1(I) = 0.0        !* initialize internal states   *!
        X2(I) = 0.0

END DO

RETURN
      END
```

Navy Case No. 82081

```
!*********************************************************************
!*********************************************************************
!*
!*   FILENAME:    LP_FILTERS.C
!*   MODULE:      LP_FILTERS()
!*   DATE:        3/18/99
!*   AUTHOR:      ALLEN ROBINS, NAWCWPNS, China Lake, CA
!*                RobinsLA@navair.navy.mil
!*
!*   DESCRIPTION:
!*       This routine performs a low pass filter bank for a multiple
!*       number of inputs.  It takes the absolute value of the inputs
!*       before filtering.
!*       The S-domain transfer function is shown below
!*
!*              wn^2/ (S^2+2*zeta*wn*S + wn^2)
!*
!*   INPUTS:
!*       Y_NF(N)      notched signals (gs)
!*
!*   OUTPUTS:
!*       Y_LP_FB(N)   low passed filtered outputs (gs)
!*
!*
!*   INCLUDE FILES:
!*       BB_EST_GNS.CMN
!*
!*   HISTORY:
!*
!*********************************************************************
!*********************************************************************!

SUBROUTINE LP_FILTERS( Y_NF, Y_LP_FB )

IMPLICIT NONE

INCLUDE 'BB_EST_GNS.CMN'

INTEGER  I, N

PARAMETER (N = 6)    !* number of filters              *!

REAL Y_NF(N)              !* outputs of notch filters (gs)   *!

REAL Y_LP_FB(N)           !* filtered signalS (gs^2)         *!

REAL X1(N),X2(N)          !* filter states                   *!

REAL K1U(N)               !*   K1*INPUT                      *!

!* ********* filter calculation ************************************ *!
      DO I = 1,N K1U(I)    = K1_LPFB * abs(Y_NF(I))
         Y_LP_FB(I) = X1(I) + K1U(I)
```

Navy Case No. 82081

```
      !* calculate new states *!

X1(I) = C1_LPFB*K1U(I) + X2(I) - D1_LPFB*Y_LP_FB(I)
      X2(I) = C2_LPFB*K1U(I)         - D2_LPFB*Y_LP_FB(I)

END DO

RETURN

!* **********   initialization   section *********************** *!

ENTRY  LP_FILTERS_IC

!* initialize filter   *!

DO I = 1,N

X1(I) = 0.0            !* initialize internal states  *!
      X2(I) = 0.0

END DO

RETURN
    END
```

Navy Case No. 82081

```
!**********************************************************************
!**********************************************************************
!*
!* FILENAME:    FIND_FREQ.FOR
!* MODULE:      FIND_FREQ(...)
!* DATE:        3/18/99
!* AUTHOR:      ALLEN ROBINS, NAWCWPNS, China Lake, CA
!*              RobinsLA@navair.navy.mil
!*
!* DESCRIPTION:
!*     This routine performs a frequency weighted average of the
!*     outputs of each of the low-pass filters. It does this by
!*     first finding the minimum and maximum values. It then
!*     normalizes each signal to be less than or equal to 1.
!*     This is done by dividing the minimum value
!*     by each signal.  These normalized signals are then scaled by
!*     subtracting the ratio of the minimum and maximum values
!*     (min_value/max_value) from each signal to increase the relative
!*     difference between each of the signals. These signals are
!*     summed and are also individually weighted by there respective
!*     notch filter frequency values.  These weighted signals are
!*     also summed.  The estimated frequency is then calculated by
!*     dividing the summed weighted signals by the summed
!*     scaled signals to give a weighted average.
!*
!* INPUTS:
!*     Y_LP_FB(6)     output of low pass filter bank (gs^2)
!*
!* OUTPUTS:
!*     Y_MIN(6)       normalized signals 0 -> 1   (unitless)
!*     Y_FREQ         estimated frequency (Hz)
!*
!* INCLUDE FILES:
!*     BB_EST_GNS.CMN
!*
!* EXTERNAL MODULES CALLED: none
!*
!* HISTORY:
!*
!**********************************************************************
!**********************************************************************!

SUBROUTINE FIND_FREQ( Y_LP_FB, Y_MIN, Y_FREQ)

IMPLICIT NONE

INCLUDE 'BB_EST_GNS.CMN'

INTEGER  FILT, COUNT,INT_SUM, I, N

PARAMETER (N = 6)    !* number of filters                    *!

REAL    Y_LP_FB(N)   !* output of low pass filter bank (gs^2)  *!

REAL    Y_MIN(N)     !* normalized signal (unitless)  for TM  *!
      REAL    Y_FREQ       !* estimated filter frequency (Hz)        *!
```

Navy Case No. 82081

```
      !*------ declare intermediate variables
      REAL     MIN_VALUE , MAX_VALUE, MIN_MAX
      REAL     SUM_X, X, SUM_FIX,  FIX !* ******** main calculations ********************************** *!

!* set the variable "min_value" to the first value in Y_LP_FB    *!

MIN_VALUE = Y_LP_FB(1)
      MAX_VALUE = Y_LP_FB(1)

DO I = 1, N
         !* search for min value and max values*!

if ( Y_LP_FB(I) .LT. MIN_VALUE ) MIN_VALUE = Y_LP_FB(I)
         if ( Y_LP_FB(I) .GT. MAX_VALUE ) MAX_VALUE = Y_LP_FB(I)

END DO

MIN_MAX = (MIN_VALUE + BIAS)/ (MAX_VALUE + BIAS)

SUM_X   = 0.0
       SUM_FIX = 0.0

DO I = 1, N

!* normalize each signal to be <= 1 by dividing the minimum  *!
         !* value by each signal *!

Y_MIN(I) = (MIN_VALUE + BIAS) / (Y_LP_FB(I) + BIAS)

!*  scale each signal by subtracting (min_value)/(max_value) *!
         !* from each *!
         !* note: the least effective filter has a value of zero      *!

X  = Y_MIN(I) - MIN_MAX

!* calculate the sum    *!

SUM_X = SUM_X + X

!* weight each signal by its filter frequency       *!

FIX  = NF_FILT_FREQS(I) * X
         SUM_FIX = SUM_FIX + FIX

END DO

!* avoid divide by zero and values that are all close together *!

IF (MIN_MAX .GE. THRESH)   THEN
        Y_FREQ = Y_FREQ           !* hold last value *!
      ELSE
         !* do a weighted average of the frequencies of the best N-1 filts
```

Navy Case No. 82081

```
      Y_FREQ = SUM_FIX / SUM_X
   END IF

RETURN

!* **********   initialization   section   ************************ *!
      ENTRY  FIND_FREQ_IC (Y_FREQ)

!* initialize Y_FREQ   *!

Y_FREQ = Y_FREQ_0

RETURN
        END
```

What is claimed is:

1. An adaptive body-bending estimator for use with a missile in flight, comprising:

first filtering means for receiving an accelerometer signal from an accelerometer located within said missile, said first filtering means having a bandpass, said bandpass being within a predetermined frequency range, said first filtering means passing frequencies of said accelerometer signal within said predetermined frequency range to form a band-passed signal;

second filtering means connected to said first filtering means, said second filtering means attenuating a plurality of center frequencies within said band-passed signal to provide a plurality of attenuated signals;

absolute value generating means connected to said second filtering means, said absolute value generating means generating an absolute value of each of said plurality of attenuated signals to provide a plurality of absolute value signals;

third filtering means connected to said absolute value generating means, said third filtering means having a natural frequency, said third filtering means processing said plurality of absolute value signals providing a plurality of time weighted average signals; and find frequency means connected to said third filtering filter, said find frequency means calculating an estimated frequency from said plurality of time weighted average signals provided by said third filtering means, said estimated frequency being a frequency at which undesirable coupling of missile structural vibrations occur through an autopilot of said missile.

2. The adaptive body-bending estimator of claim 1 wherein said first filtering means comprises a low pass filter.

3. The adaptive body-bending estimator of claim 1 wherein the predetermined frequency range of said bandpass for said first filtering means is a range from 25 hertz to 70 hertz.

4. The adaptive body-bending estimator of claim 1 wherein said second filtering means comprises a notch filter bank having six logrithmically-spaced notch filters within a frequency range of from 42 hertz to 55 hertz.

5. The adaptive body-bending estimator of claim 4 wherein said six logrithmically-spaced notch filters attenuate frequencies of 42 Hertz, 44.32 Hertz, 46.78 Hertz, 49.37 Hertz, 52.11 Hertz and 55.00 Hertz.

6. The adaptive body-bending estimator of claim 1 wherein said third filtering means comprises a low pass filter bank having six low pass filters, each of said six low pass filters having a natural frequency wn of 0.3 Hertz and a damping ratio of one.

7. An adaptive body-bending estimator for use with a missile in flight, comprising:

a band pass filter for receiving an accelerometer signal from an accelerometer located within said missile, said band pass filter having a bandpass, said bandpass being within a predetermined frequency range, said band pass filter passing frequencies of said accelerometer signal within said predetermined frequency range to form a band-passed signal;

a notch filter bank connected to said band pass filter, said notch filter bank attenuating a plurality of center frequencies within said band-passed signal to provide a plurality of attenuated signals;

an absolute value generator connected to said notch filter bank for generating an absolute value of each of said plurality of attenuated signals to provide a plurality of sixth absolute value signals;

a low pass filter bank connected to said absolute value generator, said low pass filter bank processing said plurality of absolute value signals providing of time weighted average signals; and a find frequency module connected to said low pass filter, said find frequency module calculating an estimated frequency from said plurality of time weighted average signals provided by said low pass filter bank, said estimated frequency being a frequency at which undesirable coupling of missile structural vibrations occur through an autopilot of said missile.

8. The adaptive body-bending estimator of claim 7 wherein the predetermined frequency range for said bandpass is a range from 25 hertz to 70 hertz.

9. The adaptive body-bending estimator of claim 7 wherein said notch filter bank comprises six logrithmically-spaced notch filters operating within a frequency range of between 42 hertz and 55 hertz.

10. The adaptive body-bending estimator of claim 9 wherein said six logrithmically-spaced notch filters attenuate frequencies of 42 Hertz, 44.32 Hertz, 46.78 Hertz, 49.37 Hertz, 52.11 Hertz and 55.00 Hertz.

11. The adaptive body-bending estimator of claim 7 wherein said low pass filter bank has six low pass filters, each of said six low pass filters having a natural frequency wn of 0.3 Hertz and a damping ratio of one.

12. An adaptive body-bending estimator for use with a missile in flight, comprising:

a band pass filter for receiving a yaw accelerometer signal from a yaw accelerometer located within said missile, said band pass filter having a bandpass of approximately 25 hertz to approximately 70 hertz, said band pass filter passing frequencies of said yaw accelerometer signal within said bandpass of approximately 25 hertz to 70 hertz to form a band-passed signal;

a notch filter bank connected to said band pass filter, said notch filter bank attenuating first, second, third, fourth, fifth and sixth center frequencies within said band-passed signal to provide first, second, third, fourth, fifth and sixth attenuated signals;

an absolute value generator connected to said notch filter bank for generating an absolute value of each of said first, second, third, fourth, fifth and sixth attenuated signals to provide first, second, third, fourth, fifth and sixth absolute value signals;

a low pass filter bank connected to said absolute value generator, said low pass filter bank having a natural frequency of approximately 0.3 Hertz, said low pass filter bank processing said absolute value signals providing first, second, third, fourth, fifth and sixth time weighted average signals respectively for said first, second, third, fourth, fifth and sixth absolute value signals; and a find frequency module connected to said low pass filter, said find frequency module calculating an estimated frequency from first, second, third, fourth, fifth and sixth time weighted average signals provided by said low pass filter bank, said estimated frequency being a frequency at which undesirable coupling of missile structural vibrations occur through an autopilot of said missile.

13. The adaptive body-bending estimator of claim 12 wherein said first, second, third, fourth, fifth and sixth center frequencies are respectively 42 Hertz, 44.32 Hertz, 46.78 Hertz, 49.37 Hertz, 52.11 Hertz and 55.00 Hertz.

14. The adaptive body-bending estimator of claim 12 wherein said notch filter bank comprises six logrithmically-spaced notch filters operating within a frequency range of between 42 hertz and 55 hertz.

15. The adaptive body-bending estimator of claim 12 wherein said low pass filter bank comprises six low pass filters.

16. The adaptive body bending estimator of claim 15 wherein said find frequency module calculates said estimated frequency in accordance with the equation:

$$Y\_freq = \frac{\Sigma \text{Filt\_freq}(i) \cdot X(i)}{\Sigma X(i)}$$

where:

$$\frac{\Sigma \text{Filt\_freq}(i) \cdot X(i)}{\Sigma X(i)}$$

is a frequency weighted average of the outputs of each of the low-pass filters of said low pass filter bank.

* * * * *